Dec. 11, 1962   J. B. BUTLER   3,067,477
FASTENING DEVICE
Filed Jan. 14, 1960

INVENTOR
JACK B. BUTLER
BY *Fisher Christen & Dodson*
ATTORNEY

United States Patent Office 3,067,477
Patented Dec. 11, 1962

3,067,477
FASTENING DEVICE
Jack B. Butler, 209 Hermitage Road, Greensboro, N.C.
Filed Jan. 14, 1960, Ser. No. 2,535
4 Claims. (Cl. 24—215)

This invention relates to a snap fastening device and in particular to that type of snap fastening device which is used to removably secure various articles such as trim, moulding ornamentation, and the like to a display surface.

An important objective of this invention is to provide a simplified fastener which may be used many times without replacement.

Another objective of this invention is to provide a nesting recess for the spring clip used with the invention so that the spring will not be overly depressed in a manner which would cause it to lose its resiliency.

A further objective of this invention is to provide a detachable spring clip device which may be used in circumstances where the panel or other object which is to be attached to a support surface, may be readily removed from the interior of the support, but will be impossible to remove from the exterior or panel side of the support.

A still further objective of this invention is to provide a spring clip fastening device which is readily adapted to hold panels of the type having flanges, or other like objects at various distances from the support or display surface.

Another important objective and advantage of this invention is the provision of means whereby the spring itself is dual acting in that it is firmly held within the assembly while operating to hold the panel to its support.

A still further objective of this invention is in the provision of a spring clip of the type described which is comprised of only two pieces, and which is very inexpensive to manufacture.

In order to point out the advantageous features and novel construction of this invention, it is described herewith, in the specification and drawings in an embodiment wherein such objects as letters are attached to a display surface. It is to be understood that the invention is not to be limited to such use, and may be used for other purposes where its advantages may be utilized.

Other objectives and advantages will be apparent from the following description, wherein reference is made to the accompanying drawings illustrating this embodiment of the invention. In the drawings.

Figure 1:
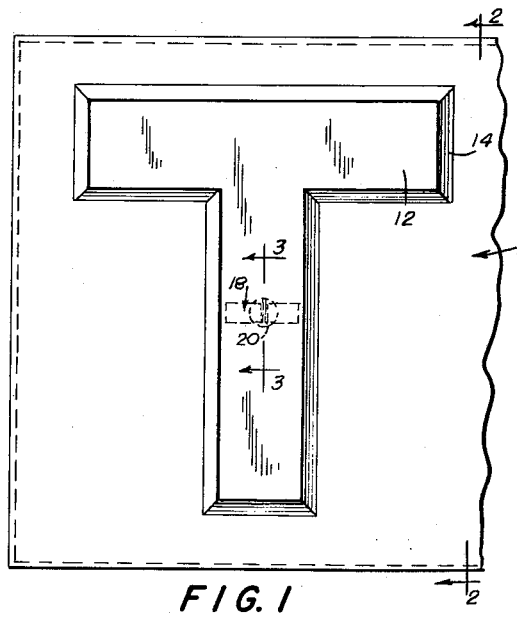
FIG. 1 is a front elevational view of a letter-figure attached to a vertical support surface.
Figure 2:
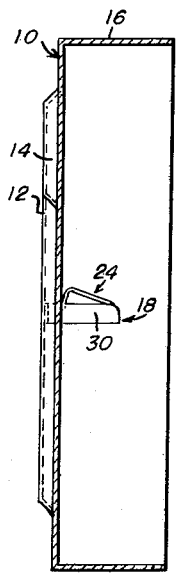
FIG. 2 is a sectional view along the line 2—2 of FIG. 1.

Referring now to the drawings; there is shown a support 10 to which such objects as letters or trim 12 are to be attached. The letter 12 is of the raised type having a flange 14 about its periphery. The support 10 is shown with sidewalls 16 to indicate that it is that type of display which has an interior not exposed or accessible to a viewer.

The panel 12 is attached to the support 10 through the action of the fastening assembly 18, which comprises the subject matter of this invention. The fastening assembly cooperates with an aperture 20 which has been preformed in the support 10. The fastening assembly is basically comprised of a T-shaped stamping 22, and a spring 24. The stamping may be made of a metallic substance, as shown, or may be of a suitable hard plastic material. The spring is preferably made of a strip of sheet metal bent in a configuration hereinafter described.

The T-shaped member consists of flanges 26 and 28 which lie against, and are parallel to panel 12, and an extension 30 having a spring receiving groove 32 substantially throughout its length. The flanges 26 and 28 are spotwelded at 34 and 36, or otherwise suitably secured to the interior of the letter or panel 12. The bottom of groove 32 ends a short distance, 40, from the flange end of the T-shaped member. As later described a portion of the spring 24 will be in this opening.

The spring 24 is comprised of several curves and leg portions. A leg 42 is adapted to lie along the bottom of groove 32, and a return leg 44, which is connected to leg 42 by return curve 46, which lies near the right end 62 of the extension 30, is adapted to be in the same plane as leg 42, but at an angle thereto. The free end 50, of the leg 44, is bent substantially perpendicular to leg 44 in a direction toward leg 42. The free end of leg 42 consists of a return hook 52 which is comprised of curve portion 56 and a shank 58. The curve portion 56 is adapted to rest in space 40. The leg 42 is of a slightly less length than groove 32 and return leg 44 extends angularly forwardly above the parallel upper margins 64 of the rear portion of extension 30. It can be seen from the dotted line in FIG. 3 that the periphery pressure will be exerted against leg 44, pushing it into the spring receiving groove when the assembly is inserted in aperture 20.

Figure 3:
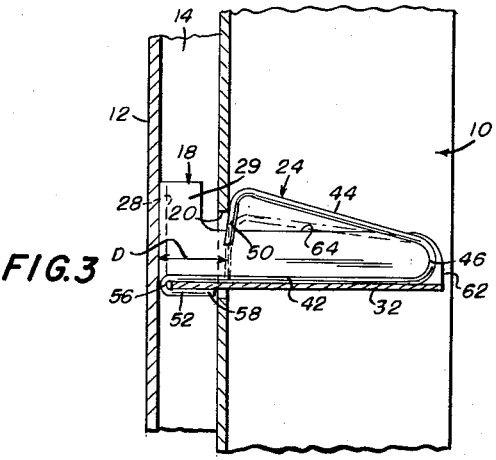
FIG. 3 is a sectional view along the line 3—3 of FIG. 1.
Figure 4:
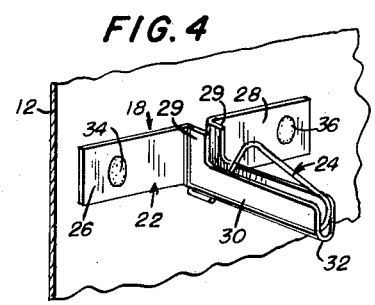
FIG. 4 is a perspective view of the invention taken from the interior of the support surface.
Figure 6:
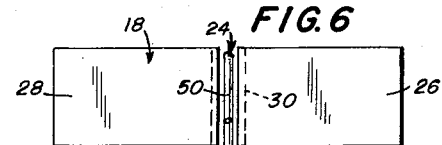
FIG. 6 is a right hand elevational view of FIG. 5.
Figure 7:
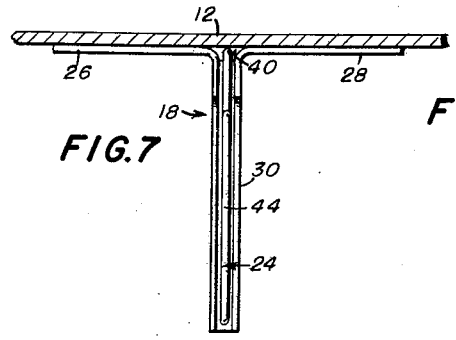
FIG. 7 is a partial plan view.
Figure 5:
FIG. 5 is a side elevational view of the clip prior to its attachment to panel.

In operation, the assembly is fastened to the interior of a piece of trim as shown best in FIG. 3. The leading end 62 of the assembly is inserted within aperture 20. The periphery of the aperture will cam leg 44 to a point within extension 30. When the device is fully inserted, the return leg 50 slides past the periphery of aperture 20, and the clip will expand to a point as shown by the full lines of FIG. 3. The length of insertion of extension 30 may be governed by the provision of the upstanding spacer portions 29 formed integrally with the respective upwardly projecting sides of the U-shaped extension 30 and the respective lateral flanges 26 and 28.

The fact that leg 50 is substantially parallel to the support surface, makes it impossible to remove the trim except by depressing leg 44 into groove 32.

The distance D between the main body section of panel 12 and that portion of leg 50 closest thereto, will determine the rigidity to which the trim may be attached to the board. The clip therefore can be used with trim paneling having a flange of greater or less magnitude than 14, by varying the distance D.

The distance D may be varied by substituting springs of various sizes, or by supplying spring blanks not having the leg 50 or the return hook 52 pre-formed. The user may then easily form the loop at a point where the proper distance D will be achieved. Either of these methods may be used for there is no permanent fastening means required between the spring 42 and the T-shaped member 22.

While the trim is fastened to the board, there is opposing pressure between leg 50 and curve 56 which keeps the trim firmly attached to the board as well as keeping the spring firmly positioned within the T-shaped member.

In a general manner, while there has been disclosed in the above description, what is deemed to be the most practical and efficient embodiment of the invention, it should be well understood that the invention is not limited to such embodiment as there might be changes made in the arrangement, disposition and form of the parts without departing from the principle of the present invention as comprehended within the scope of the accompanying claims.

I claim:
1. In fastening means, the combination including support means and latching means, said support means including, an elongated strip of flat material, said strip being longitudinally bifurcated along a portion of its length to provide two supporting legs, said strip being curved along the remainder of its length to provide an elongated portion of U-shaped cross-sectional configuration, said two legs extending laterally outwardly from one end of the U-shaped portion to provide a support for the fastening means, said latching means including a strip of spring material extending successively along the under side of the U-shaped portion upwardly around said one end of the U-shaped portion, forwardly along the upper side of the bottom of the U-shaped portion, re-entrantly curved upwardly and angularly backwardly toward said one end of the U-shaped portion, and terminating in a downwardly directed section having its end normally spaced above the bottom of the U-shaped portion, said upwardly and angularly backwardly extending section of the latching means being disposed above the upper side margins of the U-shaped portion of the support means.

2. The invention as defined in claim 1, wherein said U-shaped portion has a substantially uniform cross-section along the major portion of its length.

3. The invention as defined in claim 1, wherein said elongated U-shaped portion is provided with stop means to limit slidable movement within a cooperating opening in a panel means to space said supporting legs away from said panel means.

4. The invention as defined in claim 3, wherein that portion of the strip of flat material from which the bifurcated legs is formed is wider than that portion from which the major portion of the U-shaped portion is formed, a portion of the wider strip of material of which each of said supporting legs is formed being part of a member forming one of the sides of said U-shaped portion and projecting above the sides of said major portion to provide said stop means.

References Cited in the file of this patent

UNITED STATES PATENTS

| | | |
|---|---|---|
| 1,323,950 | Bauer | Dec. 2, 1919 |
| 1,538,320 | Gullong | May 19, 1925 |
| 1,740,830 | Parker | Dec. 24, 1929 |
| 1,992,093 | Place | Feb. 19, 1935 |
| 2,179,604 | Tinnerman | Nov. 14, 1939 |
| 2,565,636 | Tinnerman | Aug. 28, 1951 |
| 2,905,992 | Swick | Sept. 29, 1959 |

FOREIGN PATENTS

| | | |
|---|---|---|
| 1,211,073 | France | Oct. 5, 1959 |
| 1,634 | Great Britain | of 1896 |
| 68,075 | Sweden | Sept. 17, 1929 |